US009776614B2

(12) United States Patent
Goudy et al.

(10) Patent No.: US 9,776,614 B2
(45) Date of Patent: Oct. 3, 2017

(54) METHOD AND SYSTEM OF MONITORING PASSENGER BUSES

(71) Applicant: Nissan North America, Inc., Franklin, TN (US)

(72) Inventors: Roy Goudy, Farmington Hills, MI (US); Neal Probert, Farmington Hills, MI (US); Jeremy Chambers, Casco, MI (US); Andy Christensen, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 349 days.

(21) Appl. No.: 14/506,284

(22) Filed: Oct. 3, 2014

(65) Prior Publication Data

US 2016/0096519 A1    Apr. 7, 2016

(51) Int. Cl.
*B60W 10/18* (2012.01)
*B60W 10/20* (2006.01)
(Continued)

(52) U.S. Cl.
CPC .......... *B60W 10/20* (2013.01); *B60W 10/184* (2013.01); *B60W 30/16* (2013.01);
(Continued)

(58) Field of Classification Search
CPC .... B60W 10/20; B60W 10/184; B60W 50/14; B60W 50/16; B60W 2050/143;
(Continued)

(56) References Cited

U.S. PATENT DOCUMENTS 4,352,088 A    9/1982    Tsunoda
4,644,327 A    2/1987    Patterson
(Continued)

FOREIGN PATENT DOCUMENTS

EP    1962255 A1    8/2008
JP    S59-102634 A    6/1984
(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.
(Continued)

*Primary Examiner* — Mussa A Shaawat
(74) *Attorney, Agent, or Firm* — Global IP Counselors, LLP

(57) ABSTRACT

A method of monitoring passenger buses includes generating host vehicle information with a navigation unit, the host vehicle information including a host vehicle location and a host vehicle heading, receiving passenger bus information with a receiver, the passenger bus information including an passenger bus status, a passenger bus location and a passenger bus heading, determining with a controller a distance between the host vehicle location and the passenger bus location, determining with the controller whether the distance between host vehicle location and the passenger bus location is decreasing, and performing a mitigation operation, when the distance between host vehicle location and the passenger bus location is decreasing, and the distance between host vehicle location and the passenger bus location is a threshold distance or less.

20 Claims, 12 Drawing Sheets

(51) Int. Cl.
*B60W 50/16* (2012.01)
*B60W 10/184* (2012.01)
*B60W 30/16* (2012.01)
*B60W 30/17* (2012.01)
*B60W 30/18* (2012.01)
*B60W 50/14* (2012.01)
*B60W 50/00* (2006.01)

(52) U.S. Cl.
CPC ...... *B60W 30/17* (2013.01); *B60W 30/18154* (2013.01); *B60W 50/14* (2013.01); *B60W 50/16* (2013.01); *B60W 2050/0077* (2013.01); *B60W 2050/143* (2013.01); *B60W 2050/146* (2013.01); *B60W 2550/302* (2013.01); *B60W 2550/308* (2013.01); *B60W 2550/402* (2013.01); *B60W 2550/408* (2013.01)

(58) Field of Classification Search
CPC ... B60W 2050/146; B60W 2050/0077; B60W 2550/302; B60W 2550/308; B60W 2550/402; B69W 30/16; B69W 30/17; B69W 30/18154
See application file for complete search history.

(56) References Cited

U.S. PATENT DOCUMENTS

| | | | |
|---|---|---|---|
| 4,706,072 A | 11/1987 | Ikeyama | |
| 5,406,251 A * | 4/1995 | Leis | B60Q 1/50 116/39 |
| 5,570,127 A * | 10/1996 | Schmidt | B60R 1/00 340/433 |
| 5,788,336 A | 8/1998 | Trovato et al. | |
| 5,793,420 A * | 8/1998 | Schmidt | B60R 1/00 340/433 |
| 5,845,250 A | 12/1998 | Vogten | |
| 5,939,976 A | 8/1999 | Sasaki et al. | |
| 5,940,010 A | 8/1999 | Sasaki et al. | |
| 5,979,586 A | 11/1999 | Farmer et al. | |
| 6,008,741 A | 12/1999 | Shinagawa et al. | |
| 6,366,207 B1 | 4/2002 | Murphy | |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,791,471 B2 | 9/2004 | Wehner et al. | |
| 6,810,328 B2 | 10/2004 | Yokota et al. | |
| 7,274,288 B2 | 9/2007 | Nagata | |
| 8,000,897 B2 | 8/2011 | Breed et al. | |
| 8,175,796 B1 | 5/2012 | Blackburn et al. | |
| 8,182,125 B2 * | 5/2012 | Englander | B60Q 1/24 362/478 |
| 8,229,663 B2 | 7/2012 | Zeng et al. | |
| 8,340,894 B2 | 12/2012 | Yester | |
| 8,466,807 B2 | 6/2013 | Mudalige | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,717,192 B2 | 5/2014 | Durekovic et al. | |
| 2007/0109111 A1 * | 5/2007 | Breed | B60N 2/2863 340/435 |
| 2007/0132561 A1 * | 6/2007 | Rose | G08G 1/123 340/433 |
| 2007/0262881 A1 | 11/2007 | Taylor | |
| 2008/0042813 A1 * | 2/2008 | Wheatley | B60Q 9/008 340/435 |
| 2008/0042814 A1 * | 2/2008 | Hurwitz | B60Q 9/008 340/435 |
| 2009/0033540 A1 | 2/2009 | Breed et al. | |
| 2009/0140887 A1 | 6/2009 | Breed et al. | |
| 2009/0198412 A1 * | 8/2009 | Shiraki | G08G 1/161 701/36 |
| 2010/0169009 A1 | 7/2010 | Breed et al. | |
| 2010/0198513 A1 * | 8/2010 | Zeng | B60W 40/02 701/300 |
| 2011/0035139 A1 * | 2/2011 | Konlditslotis | G07C 5/008 701/119 |
| 2012/0013454 A1 * | 1/2012 | Krugh, IV | B60Q 1/50 340/433 |
| 2012/0016581 A1 * | 1/2012 | Mochizuki | G08G 1/161 701/301 |
| 2012/0025965 A1 * | 2/2012 | Mochizuki | B60Q 9/008 340/435 |
| 2012/0218093 A1 | 8/2012 | Yoshizawa et al. | |
| 2013/0099911 A1 * | 4/2013 | Mudalige | G08G 1/163 340/438 |
| 2013/0110368 A1 * | 5/2013 | Zagorski | B60T 7/22 701/70 |
| 2013/0116915 A1 | 5/2013 | Ferreira et al. | |
| 2013/0151058 A1 * | 6/2013 | Zagorski | B60W 30/09 701/23 |
| 2013/0179047 A1 | 7/2013 | Miller et al. | |
| 2013/0278440 A1 * | 10/2013 | Rubin | G08G 9/02 340/903 |
| 2013/0279392 A1 * | 10/2013 | Rubin | H04W 72/005 370/312 |
| 2015/0012203 A1 * | 1/2015 | Eriksson | B60K 31/0008 701/96 |
| 2015/0084790 A1 * | 3/2015 | Arpin | H04N 5/772 340/936 |
| 2016/0159350 A1 * | 6/2016 | Pilutti | B60W 30/143 701/23 |

FOREIGN PATENT DOCUMENTS

| | | |
|---|---|---|
| JP | S61-253238 A | 11/1986 |
| JP | 2000-127796 A | 5/2000 |
| JP | 2001-118199 A | 4/2001 |
| JP | 2003-51099 A | 2/2003 |
| WO | 03091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of the Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104, 2009).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harder, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14, 2003).

\* cited by examiner

METHOD AND SYSTEM OF MONITORING PASSENGER BUSES

BACKGROUND

Field of the Invention

The present invention generally relates to a method and system of monitoring passenger buses. More specifically, the present invention relates to a method and system disposed in a host vehicle that provides passenger bus information so as to improve vehicle safety and enable the driver of the host vehicle to abide by local jurisdictional requirements in avoiding passing a passenger bus when stopped for passenger children.

Background Information

In recent years, vehicles have become more equipped with features for improving safety. For example, vehicles can be equipped with a contact warning system that identifies the location of the vehicle and the locations of other nearby vehicles to determine whether the vehicle may come into contact with any of the other vehicles. These systems generally include sensors that detect the location and proximity of vehicles and objects relative to a host vehicle and warn the driver of the host vehicle of possible contact with the vehicle or object. Some systems can alter the speed or trajectory of the host vehicle in attempting to avoid contact.

SUMMARY

It has been discovered that a vehicle may require advanced warning to maintain the proper distances between a host vehicle and a passenger bus. Moreover, it is apparent that the jurisdictional requirements regarding passenger buses may vary in different states or cities, and thus, the requirements may be unknown to the driver of the host vehicle. In view of the state of the known technology, one aspect of the present disclosure is to provide a mitigation operation to a host vehicle when approaching a passenger bus. In one disclosed embodiment, a method of monitoring passenger buses comprises generating host vehicle information with a navigation unit, the host vehicle information including a host vehicle location and a host vehicle heading, receiving passenger bus information with a receiver, the passenger bus information including a passenger bus status, a passenger bus location and a passenger bus heading, determining with a controller a distance between the host vehicle location and the passenger bus location, determining with the controller whether the distance between host vehicle location and the passenger bus location is decreasing, and performing a mitigation operation, when the distance between host vehicle location and the passenger bus location is decreasing, and the distance between host vehicle location and the passenger bus location is a threshold distance or less.

These and other objects, features, aspects and advantages of the present invention will become apparent to those skilled in the art from the following detailed description, which, taken in conjunction with the annexed drawings, discloses an embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
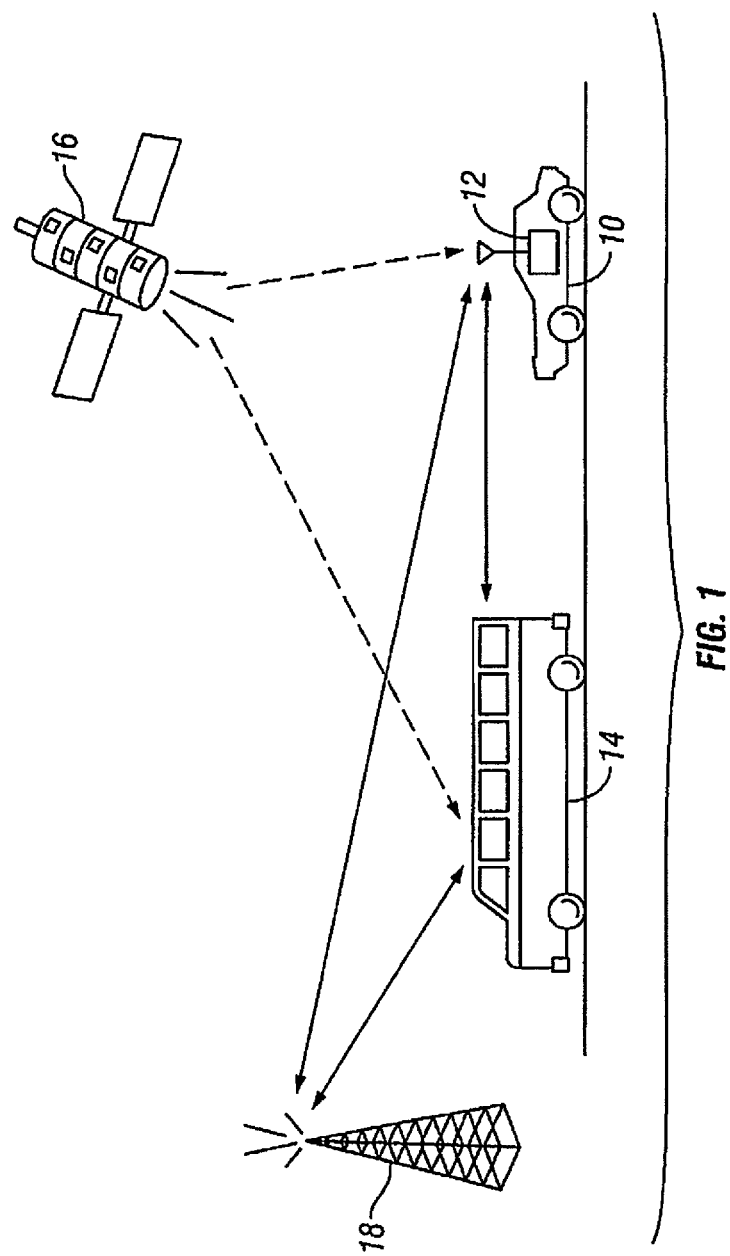
FIG. 1 is a block diagram illustrating an example of a vehicle equipped with a passenger bus monitoring system according to embodiments disclosed herein in relation to a passenger bus and components of a wireless communication network.

FIG. 1 is a block diagram illustrating a host vehicle (HV) 10 that is equipped with a passenger bus monitoring system 12 according to a disclosed embodiment. The passenger bus monitoring system 12 communicates with at least one passenger bus 14 (PB). The passenger bus 14 can include a type of two-way communication system that is capable of communicating information about at least the location, speed, status and direction of the passenger bus 14 as understood in the art.

The passenger bus monitoring system 12 of the host vehicle 10 and the passenger bus 14 can communicate with a two-way wireless communications network. The two-way wireless communications network can include one or more global positioning satellites 16 (only one shown) and one or more roadside units 18 (only one shown) that send and receive signals to and from the passenger bus monitoring system 12 of the host vehicle 10 and the passenger bus 14.

Figure 2:
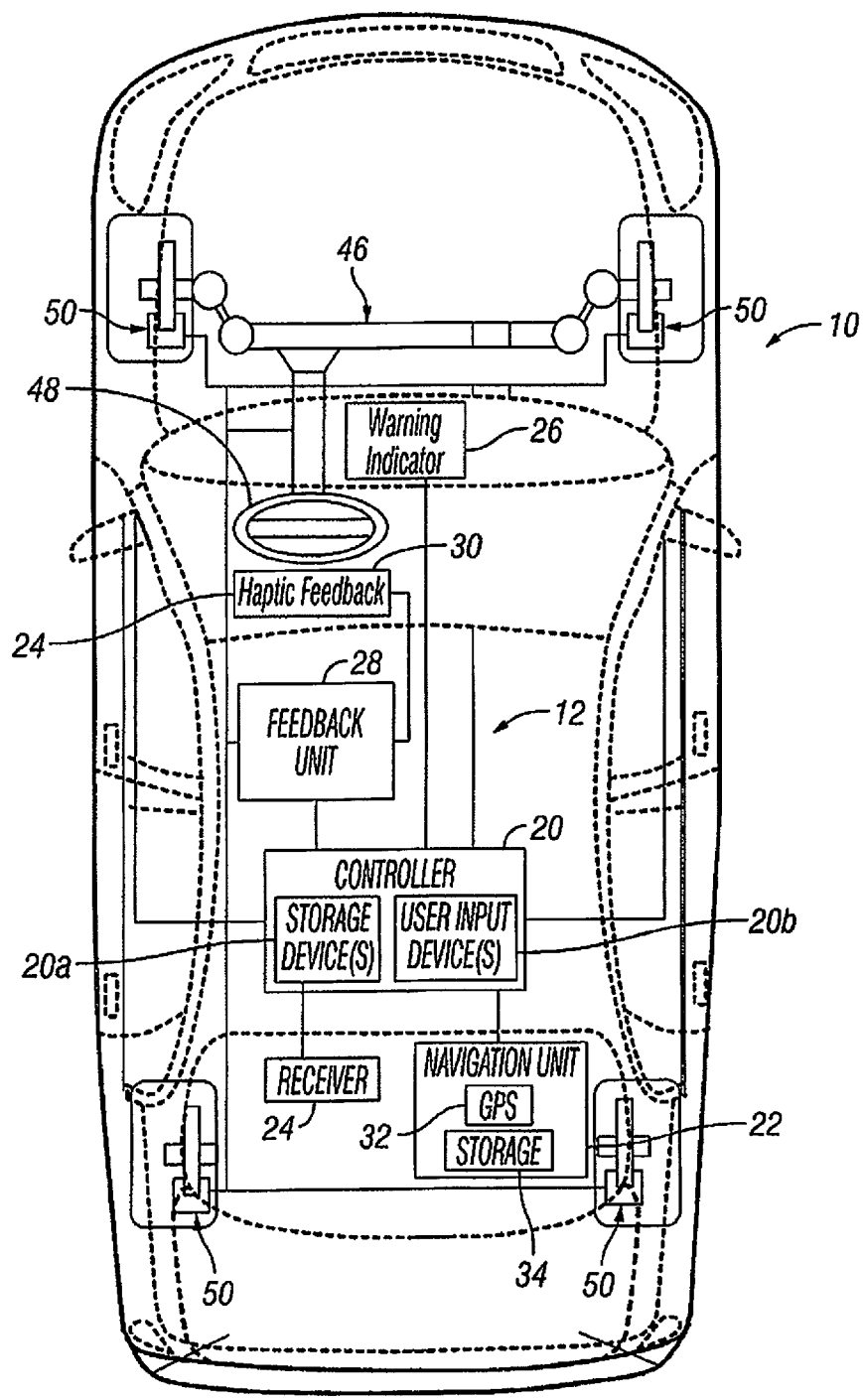
FIG. 2 is a schematic view of an example of a vehicle equipped with a passenger bus monitoring system according to embodiments disclosed herein.

Turning to FIG. 2, a passenger bus monitoring system 12 for a host vehicle 10 is illustrated in accordance with one embodiment. The passenger bus monitoring system 12 includes a controller 20, a navigation unit 22, a receiver 24, a warning indicator 26 or system, a feedback unit 28 and a haptic feedback device 30.

The controller 20 preferably includes a microcomputer with a control program that controls the passenger bus monitoring system 12 as discussed below. A passenger bus cab include school buses, commuter buses, and other forms of transportation that invoke legal protection while loading and unloading passenger. The controller 20 can also include other conventional components such as an input interface circuit, an output interface circuit, and storage device(s) 20*a* such as a ROM (Read Only Memory) device and a RAM (Random Access Memory) device. The microcomputer of the controller 20 is programmed to control one or more of the navigation unit 22, the warning indicator 26 or system, the feedback unit 28 and the haptic feedback device 30, and to make determinations or decisions, as discussed herein. The memory circuit stores processing results and control programs, such as ones for the navigation unit 22, the warning indicator 26 or system, the feedback unit 28 and the haptic feedback device 30 operation that are run by the processor circuit. The controller 20 is operatively coupled to the navigation unit 22, the warning indicator 26 or system, the feedback unit 28 and the haptic feedback device 30 in a conventional manner, as well as other electrical systems in the vehicle, such the turn signals, windshield wipers, lights and any other suitable systems. Such a connection enables the controller 20 to monitor and control any of these systems as desired. The internal RAM of the controller 20 stores statuses of operational flags and various control data. The internal ROM of the controller 20 stores the information for various operations. The controller 20 is capable of selectively controlling any of the components of the passenger bus monitoring system 12 in accordance with the control program. It will be apparent to those skilled in the art from this disclosure that the precise structure and algorithms for the controller 20 can be any combination of hardware and software that will carry out the functions of the present invention.

As shown in FIG. 2, the controller 20 can include or be in communication with user input devices 20*b*. The user input devices 20*b* can include, for example, a human-machine interface (HMI) which enables a user (e.g., the driver and/or passenger) to interact with the passenger bus monitoring system 12 as understood in the art and discussed herein. The controller 20 can further include or be in communication with one or more storage device(s) 20*a* which can store information as discussed herein.

The passenger bus monitoring system 12 may include a navigation unit 22, such as a GPS 32. In one embodiment, the host vehicle 10 receives a GPS satellite signal. As is understood, the GPS 32 processes the GPS satellite signal to determine positional information (such as location, speed, acceleration, yaw, and direction, just to name a few) of the host vehicle 10. As noted herein, the navigation unit 22 is in communication with the controller 20, and is capable of transmitting such positional information regarding the host vehicle 10 to the controller 20.

The navigation unit 22 also can include a storage device 34 that stores map data. Thus, in determining the position of the host vehicle 10 using any of the herein described methods, devices or systems, the positioning of the host vehicle 10 may be compared to the known data stored in the storage device 34. Thus, the passenger bus monitoring system 12 may accurately determine the location of the host vehicle 10 on an electronic map. The storage device 34 may also store any additional information including the current or predicted vehicle position and any past vehicle position/route or any other suitable information.

The passenger bus monitoring system 12 may include a receiver 24. The receiver 24 can be any suitable receiver 24 that is capable of receiving data or information wireless from a passenger bus 14 or other suitable source.

Figure 3:
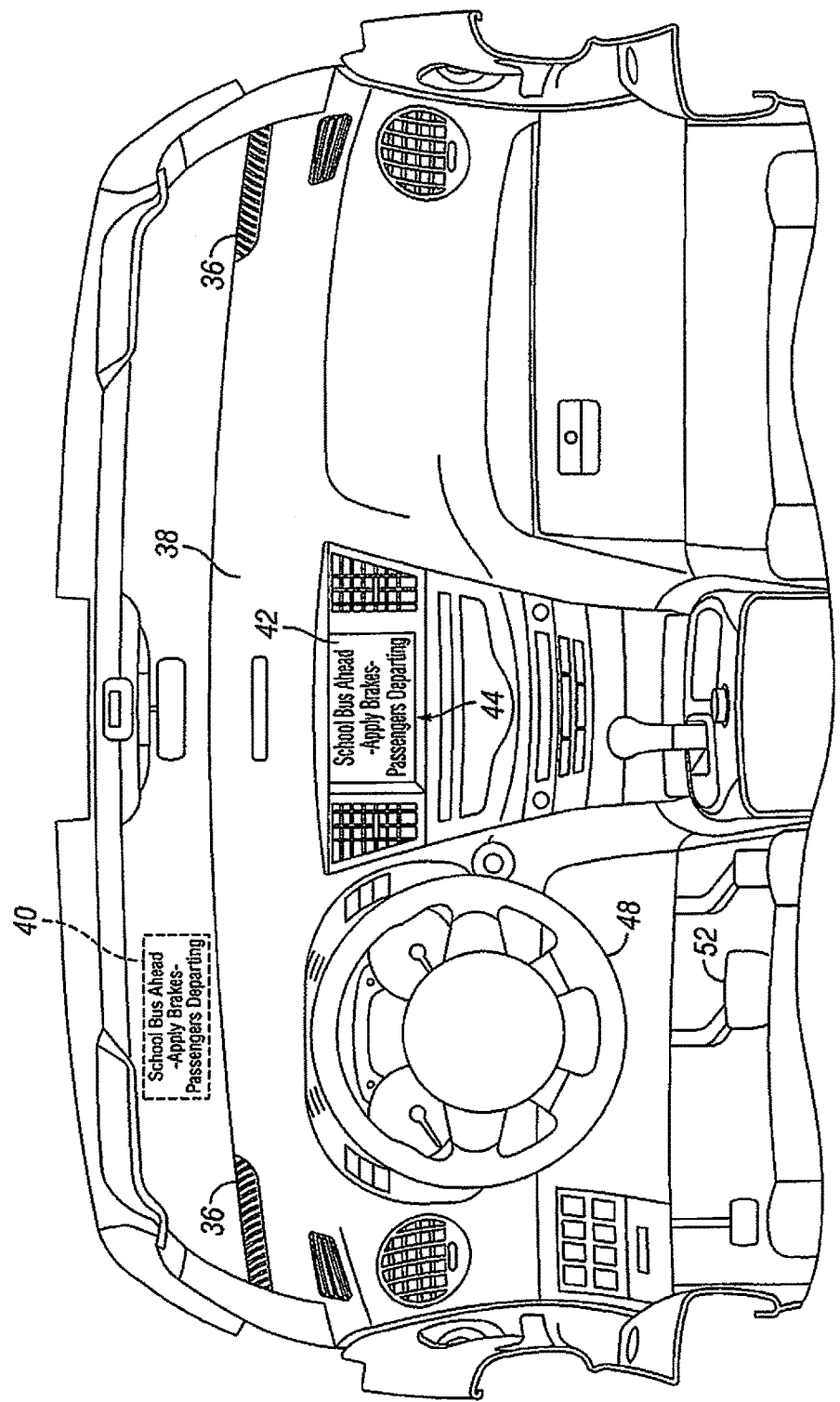
FIG. 3 is a partial interior view of the passenger compartment of a vehicle equipped with a passenger bus monitoring system according to embodiments disclosed herein.

The passenger bus monitoring system 12 may include a warning indicator 26. As shown in FIG. 3, the warning indicator 26 may perform a mitigation operation that would facilitate the operator of the host vehicle 10 in avoiding contact or passing passenger bus 14 during loading or unloading of passengers. In one example, the mitigation operation can be visual warning and/or an audio output warning. For example, the warning indicator 26 may include a visual display or light indicator that flashes or illuminates the instrument cluster on the instrument panel 38 of the host vehicle 10, activates a heads-up display 40, is a visual readout 42 in an information display unit 44, is an audible noise emitted from a speaker 36, or any other suitable visual display or audio or sound indicator or combination thereof that notifies the driver or interior occupant of the host vehicle 10 that a passenger bus 14 has been detected and the host vehicle 10 may require an action to avoid contact or passing passenger bus 14 during loading or unloading of passengers. As shown specifically in FIG. 3, both the heads-up display 40 and the information display unit 44 show a visual warning of "School Bus Ahead—Apply Brakes—Passengers Departing", which can include an instruction which will aid the driver in complying with local laws.

As shown in FIGS. 2 and 3, the feedback unit 28 may include a mitigation operation, such as providing tactile feedback generated by the haptic feedback device 30 that can be a vibration actuator in the steering wheel, the driver seat, or any other suitable location within the host vehicle 10. That is, the mitigation operation can include providing haptic feedback to a portion of an interior of the host vehicle 10 located proximate to the driver. For example, the mitigation operation may be a feedback force within the steering system 46 or braking system 50 that notifies the driver that the steering wheel 48 should be turned in a specific direction or that the brakes 52 should be applied. Such a mitigation operation does not necessarily need to alter the trajectory of the vehicle but may be a minor turn of the steering wheel 48 simply to notify the driver that a steering wheel operation is necessary. Moreover, the force feedback within the braking system 50 may simply be a pumping of the brake 52 to indicate that the brake 52 should be applied without actually activating the braking system 50. The feedback unit 28 is connected to the controller 20, which is programmed to operate the feedback unit 28 to warn the driver or control the vehicle.

Additionally, the feedback unit 28 may also be connected to the steering system 46 of the host vehicle 10, such that the controller 20 can control the steering system 46 of the host vehicle 10. Thus, when the controller 20 determines that automatic operation of the steering system 46 is necessary to avoid interfering with the operation of the passenger bus 14 or to avoid coming within the jurisdictional distance requirements of the passenger bus 14 when passengers are departing or entering the passenger bus 14, the controller 20 can cause the steering system 46 to alter the trajectory of the vehicle 10. In the same manner, the feedback unit 28 may be connected to the braking system 50 of the host vehicle 10 to apply the brakes 52 of the host vehicle 10 to avoid interfering with the operation of the passenger bus 14 or to avoid coming within the jurisdictional distance requirements of the passenger bus 14 when passengers are departing or entering the passenger bus 14. Accordingly, in one embodiment, the mitigation operation includes applying the brakes 52 of the host vehicle 10 and/or altering the trajectory of the host vehicle 10 by manipulating the steering system of the host vehicle 10.

Figure 4A:
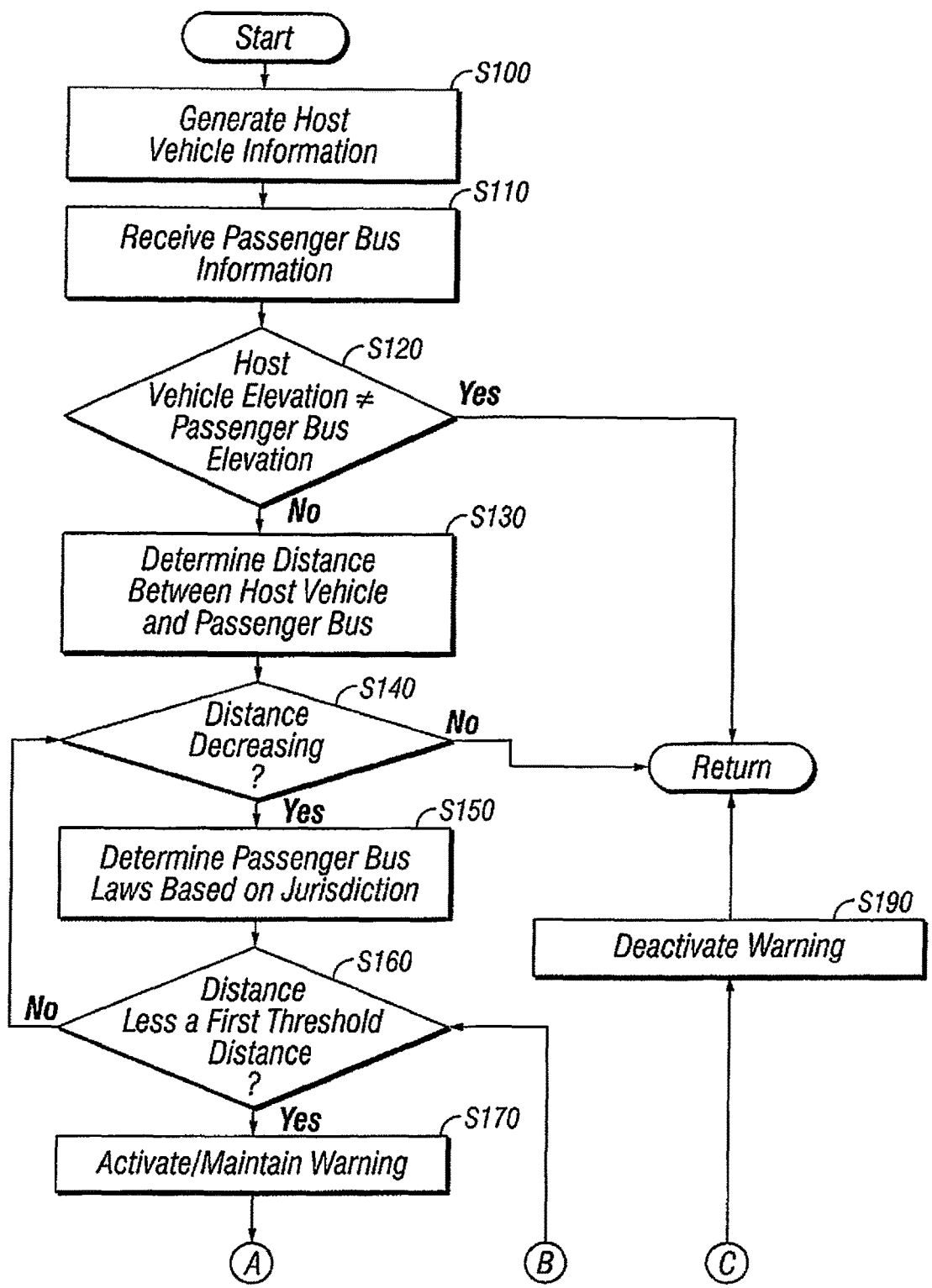
FIGS. 4A and 4B are flowcharts illustrating exemplary operations for determining the mitigation operation of the passenger bus monitoring system according to disclosed embodiments.
Figure 4B:
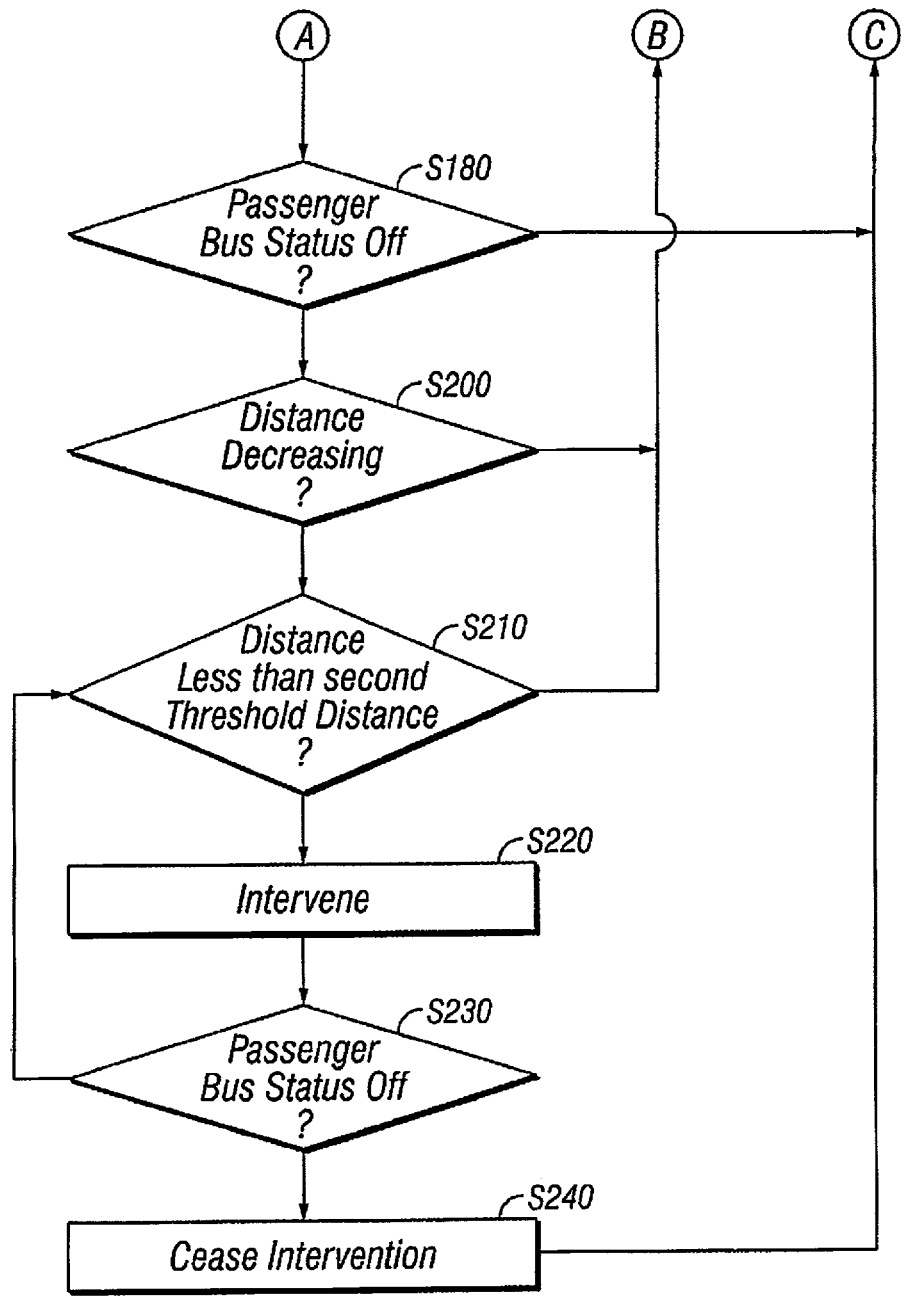

FIGS. 4A and 4B are flow charts illustrating the procedure that the passenger bus monitoring system 12 performs in determining whether a mitigation operation is necessary in avoiding coming within the jurisdictional distance requirements of the passenger bus 14 when passengers are departing or entering the passenger bus 14. First, the passenger bus monitoring system 12 generates host vehicle 10 information in S100. This information can be generated by a navigation unit 22 that is capable of determining location (e.g. latitude and longitude), speed and direction of the host vehicle 10, as described herein. It is noted that the host vehicle 10 information can be generated in any suitable manner, using any suitable system.

Then the receiver 24 of the passenger bus monitoring system 12 receives passenger bus 14 information with the receiver 24 in S110, the passenger bus 14 information can include any suitable information. For example, the passenger bus 14 information can include a passenger bus operation status, a passenger bus 14 location and a passenger bus 14 heading. The status information can be whether the passenger bus 14 has activated a passenger bus stopping signal 14a, such as a caution light 14a$_1$ (or a stop sign 14a$_2$) invoking a requirement for neighboring vehicles to stop or yield (See FIGS. 9-13). Additionally, the status information may simply be an electronic signal that the passenger bus 14 is invoking the requirement for neighboring vehicles to stop or yield. Further, the passenger bus can be in any suitable caution state, including caution lights only, or signage only, or any combination of lights and signage and moving and stopped. That is, for example, the passenger bus 14 may be moving and have caution lights on 14a$_1$.

The controller 20 of the passenger bus monitoring system 12 then determines in S120 based on the host vehicle 10 information and the passenger bus information, whether the height or elevation of the host vehicle 10 is the same or substantially the same as the passenger bus 14. Thus, if the controller 20 determines that the host vehicle 10 and the passenger bus 14 are not at the same elevation, the controller 20 can make a determination that the passenger bus 14 and the host vehicle 10 are on different road planes. For example, the host vehicle 10 may be on an overpass or underpass, such that the host vehicle 10 will pass over or under the passenger bus 14. In such a situation, it would not be necessary for the host vehicle 10 to take any action relative to the passenger bus 14. The controller 20 may also compare the elevational difference between the host vehicle location and the passenger bus location and map data and determine that while the vehicles are at different elevations, the vehicles are on a road or roads on which the host vehicle 10 and the passenger bus 14 will intersect at a future time due to topography.

The controller 20 in S130 then determines the distance between the host vehicle location and the passenger bus location. Preferably, the distance between the host vehicle location and the passenger bus location is a straight line distance based on the information provided by the passenger bus 14 and generated by the host vehicle 10. The controller 20 determines in S140, based on the host vehicle 10 information and the passenger bus information, whether the distance between host vehicle 10 and the passenger bus 14 is decreasing. If the distance between the host vehicle location and the passenger bus location is not decreasing (i.e., increasing), the controller 20 determines that the host vehicle 10 and the passenger bus 14 are diverging and no action is necessary. The passenger bus monitoring system 12 returns to start.

In one embodiment, a controller 20 determines a relationship between the host vehicle location and the passenger bus location based on a straight line between the host vehicle location and the passenger bus location, and an angle between the host vehicle heading and the straight line based on a fixed coordinate system and a preselected angle direction, as discussed in more detail in FIGS. 5-8. In this embodiment, the controller 20 determines whether the host vehicle 10 and the passenger bus 14 are travelling on converging paths based on the relationship therebetween. Further, if desired the controller 20 can determine the possibility that the host vehicle 10 and the passenger bus 14 will cross paths based on the host vehicle travel time from the host vehicle location to the location at which the host vehicle 10 and the passenger bus 14 will cross paths and the travel time from the passenger bus location to the location at which the host vehicle 10 and the passenger bus 14 will cross paths that is determined based on the passenger bus information and determine a threshold value (e.g., a time value and/or distance value) based on a current moving state of the host vehicle 10 while the possibility of the host vehicle 10 and the passenger bus 14 cross paths exists. In this embodiment, whether a mitigation operation is necessary can be determined based on the threshold value.

Returning to FIGS. 4A and 4B, when the distance between the host vehicle location and the passenger bus location is decreasing the controller 20 determines the jurisdiction of the location of the host vehicle 10 in S150. This determination can be accomplished based on the host vehicle 10 information generated by the navigation system. For example, the controller 20 can compare the latitude and longitude information of the host vehicle 10 to an electronic map to determine the jurisdiction of the host vehicle 10 (i.e., the city and/or state in which the host vehicle 10 is located). Based on the jurisdiction of the host vehicle 10, the controller 20 determines the passenger bus laws that govern the host vehicle 10. The controller 20 can determine the passenger bus laws from data stored in the storage device on board the host vehicle 10 or form a storage device (such as remote server or other device) with which the controller 20 is capable of communicating, or in any other suitable manner. That is, once the controller 20 has determined the host vehicle jurisdiction, the passenger bus laws can be determined based on a stored table for each jurisdiction in the United States or any other jurisdiction. The passenger bus laws may provide information of a distance at which the host vehicle 10 must maintain between the host vehicle location and the passenger bus location and situations in which it may not be necessary to act (e.g., when a median separates the host vehicle 10 and the passenger bus 14).

Additionally, the jurisdictional laws may indicated the appropriate action for various states of the passenger bus. For example, the passenger bus may define a caution state that includes the passenger bus being stopped and only activating caution lights 14a$_1$, or only displaying a stop sign 14a$_2$. Moreover, the passenger may include a no caution state that includes the passenger bus moving with no caution lights, stopped and no caution lights and stopped with the stop sign retracted. Further some jurisdictions may include a partial caution state that includes the passenger bus being stopped with caution lights 14a$_1$ on and the stopped sign retracted or the passenger bus moving with only caution lights 14a$_1$.

The controller 20 then determines in S160 whether the distance between the host vehicle location and the passenger bus location is less than a first threshold distance. When the distance between the host vehicle location and the passenger bus location is less than the first threshold distance, the controller 20 causes a mitigation operation to be performed in S170, such as activating a warning. The warning can be any visual, auditory or tactile warning discussed herein. Further, the first threshold distance can be any suitable distance determined based on the passenger bus laws for the current jurisdiction, or based on any other suitable determination.

In step S180, the controller 20 determines whether the passenger bus operation status (e.g., a stopping signal) is off. When the passenger bus operation status has been terminated (e.g., the stopping signal has been turned off), the controller 20 deactivates the warning in S190. However, when the passenger bus operation status (e.g., a stopping signal) is still on, the controller 20 determines whether the distance between the host vehicle location and the passenger bus location continues to decrease in step S200.

When the distance between the host vehicle location and the passenger bus location is not decreasing, the controller 20 maintains the mitigation operation (i.e., the warning) performed in S170. When the distance between the host vehicle location and the passenger bus location is decreasing, the controller 20 determines whether the distance is less than or equal to a second threshold distance in S210. The second threshold distance is preferably less than the first threshold distance, but can be the same if desired. The second threshold distance can be set based on the passenger bus laws for the current jurisdiction. For example, the passenger bus laws for the current jurisdiction may require that when stopping for a passenger bus 14, the host vehicle 10 is not to be within 500 feet of the passenger bus 14. Additionally the second threshold distance be set to not approach a passenger bus 14 within a distance of a standard lane width or some other predetermined distance when a passenger bus 14 on the road the other side of a road. When the distance between the host vehicle location and the passenger bus location is greater than the second threshold distance, the controller 20 returns to step S170 to maintain the mitigation operation (i.e., the warning).

When the distance between the host vehicle location and the passenger bus location is less than the second threshold distance, the controller 20 determines that a mitigation operation (e.g. intervention) should be performed in S220. Under such circumstances, the controller 20 may apply the host vehicle brakes 52 or alter the trajectory of the host vehicle 10 by manipulating the steering system of the host vehicle 10.

After the controller 20 begins performance of the mitigation operation, the controller 20 determines if passenger bus operation status has changed in S230. When the passenger bus operation status is on (e.g., the passenger bus stopping signal is on), the controller 20 monitors whether the distance is less than the second threshold in step S210.

When the passenger bus operation status is off (e.g., the passenger bus stopping signal is off), the controller 20 ceases the mitigation operation (e.g., application of brakes 52) in S240 and the warning signal in S190. In other words, the controller 20 ceases the mitigation operation based on a predetermined condition (i.e., the changing of the operation status). Based on jurisdiction, the changing of the operation status can be the status of specific caution states of the passenger bus. For example, the passenger bus may define a caution state that includes the passenger bus being stopped and only activating caution lights $14a_1$, or only displaying a stop sign $14a_2$. Moreover, the passenger may include a no caution state that includes the passenger bus moving with no caution lights, stopped and no caution lights and stopped with the stop sign retracted. Further some jurisdictions may include a partial caution state that includes the passenger bus 14 being stopped with caution lights $14a_1$ and a stopped sign retracted or the passenger bus moving with only caution lights $14a_1$. A partial caution state may require caution, but allowing the host vehicle 10 to pass, since the passenger bus 14 is not actively loading or unloading passengers. Based on the jurisdictional laws the controller will determine whether the mitigation operation must be maintained or whether the mitigation operation can be terminated.

It is noted that the steps in the above describe process may be performed in any suitable order and may include additional steps or exclude steps.

Examples of possible locations of a passenger bus 14 are shown in the graphs of FIGS. 5 through 8. In these graphs, the heading angle for the host vehicle 10 is represented by $\delta_{HV}$ and the heading angle for the passenger bus 14 is represented by $\delta_{PB}$ for the passenger bus 14 with 0 degrees representing north, $\pi/2$ (90 degrees) representing east, $\pi$ (180 degrees) representing south and $3\pi/2$ (270 degrees) representing west. The sectors are adjacently geographically distributed about the host vehicle 10 location which is at the geographic center of the area where each of the sectors meet. Furthermore, the sectors are separated by a north-south directional line and an east-west directional line that intersect at the host vehicle 10 location. In this case, since there are four sectors, they can be referred to as quadrants.

Figure 5:
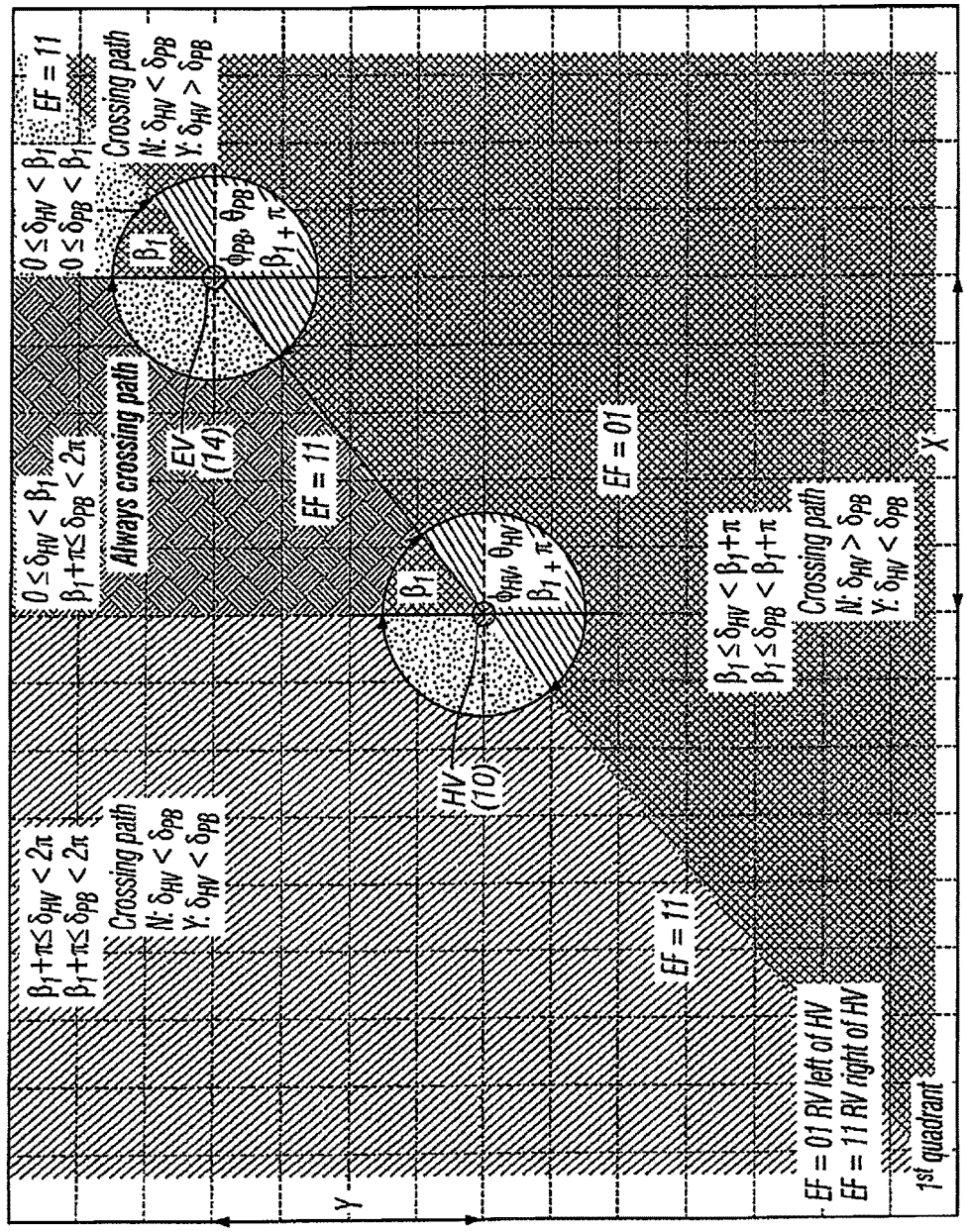
FIG. 5 is a graph illustrating an example of a four quadrant coordinate system which shows an example of a location of a passenger bus within the first quadrant with respect to a location of the host vehicle which is at the center of the coordinate system.
Figure 6:
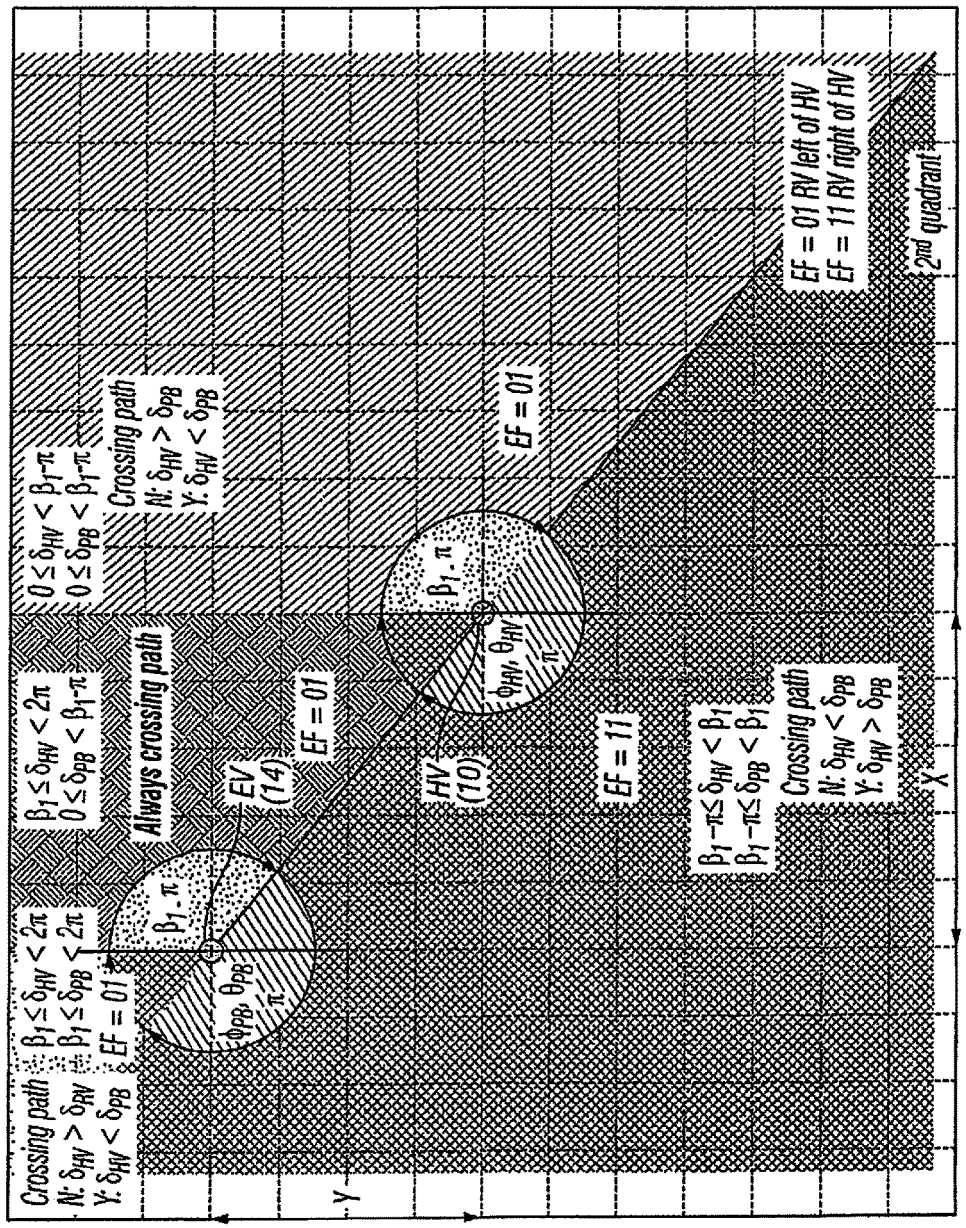
FIG. 6 is a graph illustrating an example of a location of a passenger bus within the second quadrant of the four quadrant coordinate system with respect to a location of the host vehicle which is at the center of the coordinate system.
Figure 7:
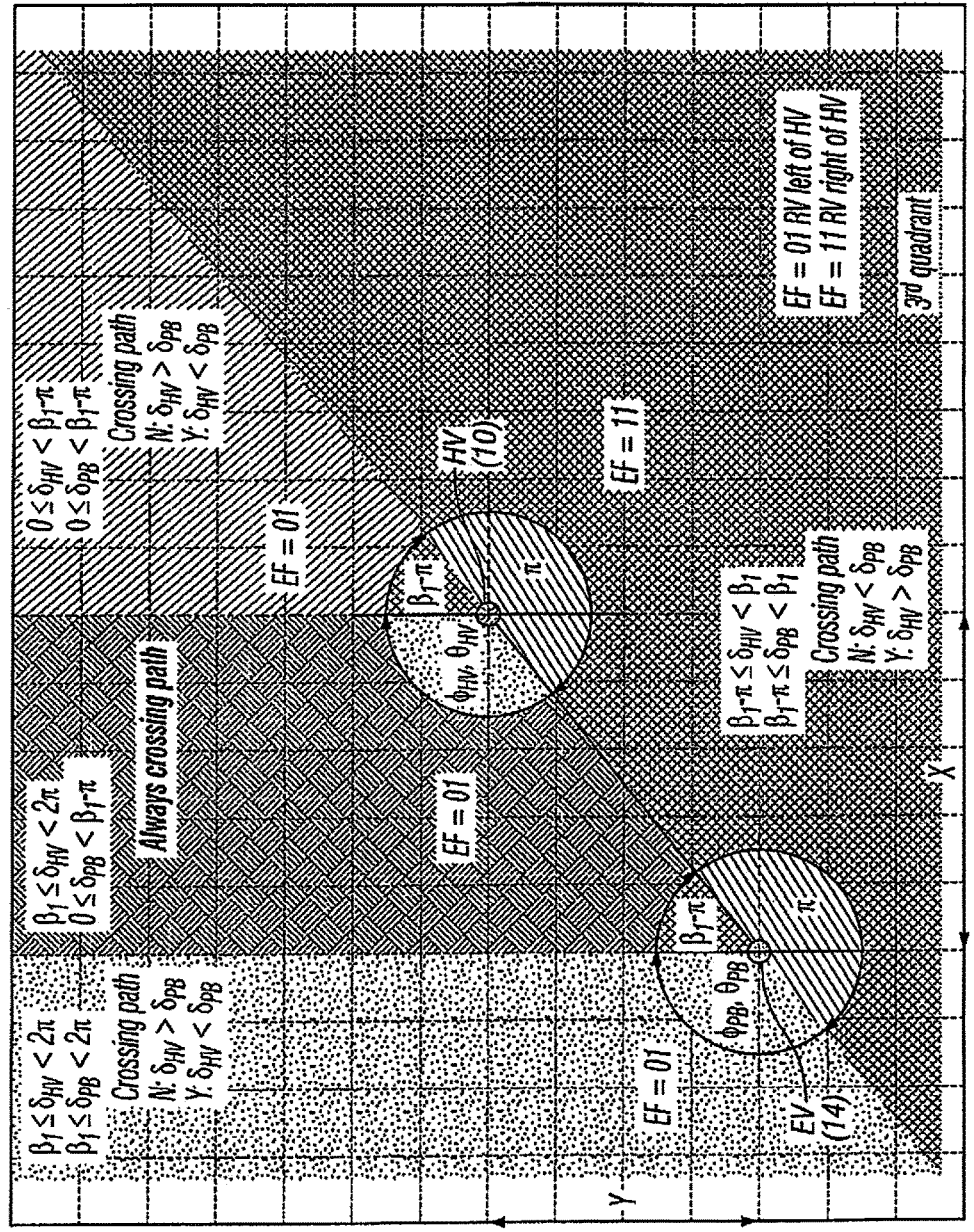
FIG. 7 is a graph illustrating an example of a location of a passenger bus within the third quadrant of the four quadrant coordinate system with respect to a location of the host vehicle which is at the center of the coordinate system.
Figure 8:
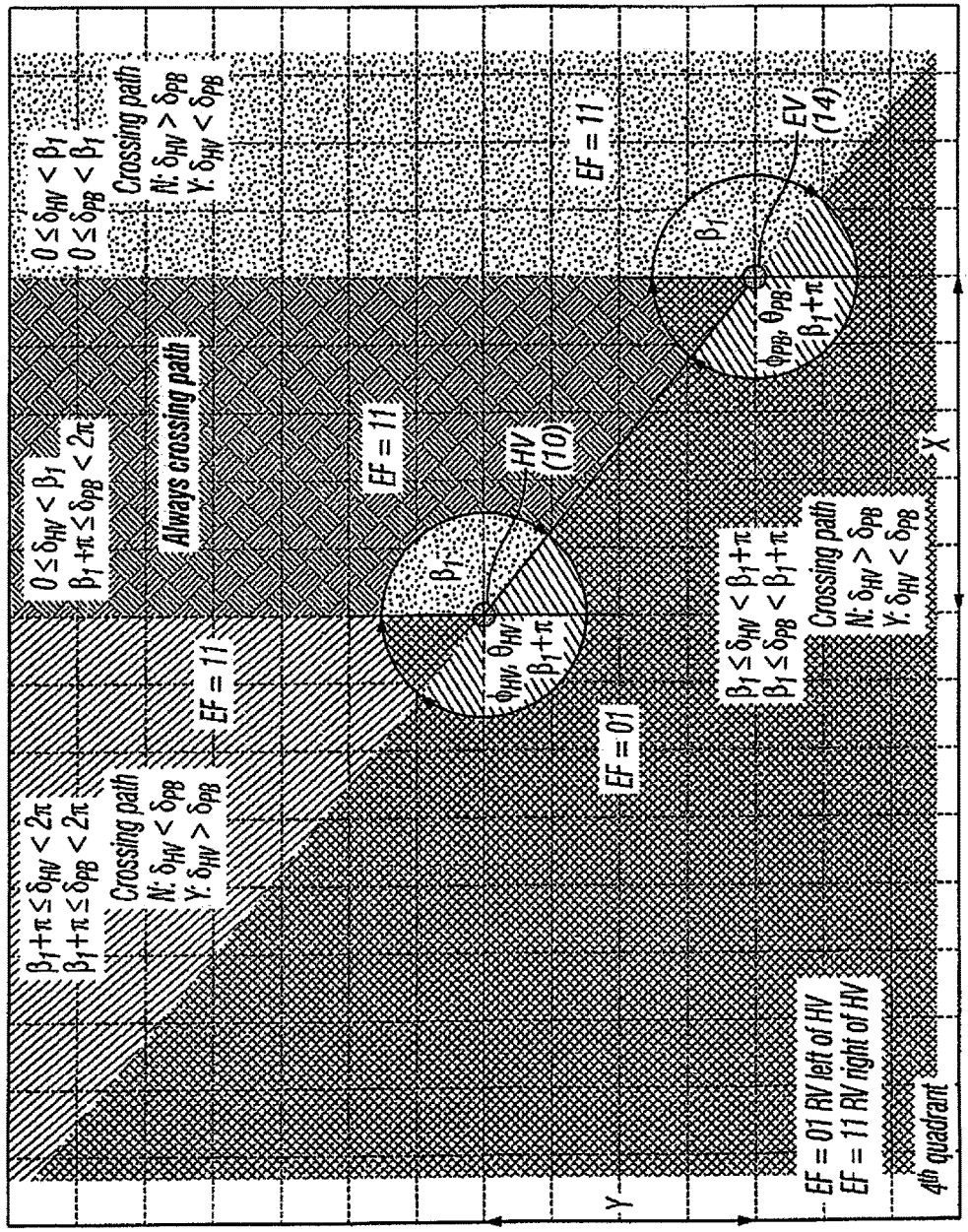
FIG. 8 is a graph illustrating an example of a location of a passenger bus within the fourth quadrant of the four quadrant coordinate system with respect to a location of the host vehicle which is at the center of the coordinate system.

As shown in FIG. 5, if the passenger bus 14 is to the north and east of the host vehicle 10, the passenger bus 14 is in the $1^{st}$ quadrant. If the passenger bus 14 is to the north and west of the host vehicle 10, the passenger bus 14 is in the $2^{nd}$ quadrant as shown in FIG. 6. If the passenger bus 14 is to the south and west of the host vehicle 10, the passenger bus 14 is in the $3^{rd}$ quadrant as shown in FIG. 7. As shown in FIG. 8, if the passenger bus 14 is to the south and east of the host vehicle 10, the passenger bus 14 is in the $4^{th}$ quadrant.

The $1^{st}$ quadrant is defined by the following conditions:

$$\theta_{PB} > \theta_{HV}, \phi_{PB} > \phi_{HV}, \left(0 \leq \beta_1 < \frac{\pi}{2}\right).$$

Within the $1^{st}$ quadrant, certain headings of the host vehicle 10 and the passenger bus 14 that result in crossing paths can be determined by the following matrices in Table 1, where $\delta_{HV} < \delta_{RV}$ in one matrix and $\delta_{HV} > \delta_{RV}$ in the other matrix.

TABLE 1

Matrices Representing Possible Crossing Paths in the $1^{st}$ Quadrant

| YZ | | 00<br>$0 \leq$<br>$\delta_{PB} \leq \beta_1$ | 01<br>$\beta_1 < \delta_{PB} \leq$<br>$\beta_1 + \pi$ | 11<br>$\beta_1 + \pi <$<br>$\delta_{PB} < 2\pi$ |
|---|---|---|---|---|
| $\delta_{HV} < \delta_{PB}$<br>WX | | | | |
| 00 | $0 \leq \delta_{HV} \leq \beta_1$ | 0 | 0 | 1 |
| 01 | $\beta_1 < \delta_{HV} \leq \beta_1 + \pi$ | x | 1 | 0 |
| 11 | $\beta_1 + \pi < \delta_{HV} < 2\pi$ | x | x | 0 |

TABLE 1-continued

Matrices Representing Possible Crossing Paths in the $1^{st}$ Quadrant

|  | YZ | 00<br>$0 \leq$<br>$\delta_{PB} \leq \beta_1$ | 01<br>$\beta_1 < \delta_{PB} \leq$<br>$\beta_1 + \pi$ | 11<br>$\beta_1 + \pi <$<br>$\delta_{PB} < 2\pi$ |
|---|---|---|---|---|
| $\delta_{HV} > \delta_{RV}$ |  |  |  |  |
| XW |  |  |  |  |
| 00 | $0 \leq \delta_{HV} \leq \beta_1$ | 1 | x | x |
| 01 | $\beta_1 < \delta_{HV} \leq \beta_1 + \pi$ | 0 | 0 | x |
| 11 | $\beta_1 + \pi < \delta_{HV} < 2\pi$ | 0 | 0 | 1 |

These two matrices identify four cases where paths cross (1), eight cases where paths do not cross (0) and six cases that are not possible (x). For example, if the heading angle $\delta_{HV}$ of the host vehicle 10 is greater than $\beta_1$ and the heading angle $\delta_{SB}$ of the passenger bus 14 is less than $\beta_1$, then $\delta_{HV}$ cannot be less than $\delta_{PB}$ (WXYZ=0100 for $\delta_{HV} < \delta_{PB}$). It can also be seen that when the passenger bus 14 is in the $1^{st}$ quadrant, the passenger bus 14 will be to the left of the host vehicle 10 (EF=01) when the heading angle of the host vehicle 10 is greater than $\beta_1$ and less than $\beta_1+\pi$ ($\beta_1 < \delta_{HV} < \beta_1 + \pi$), otherwise the passenger bus 14 will be to the right (EF=11) of the host vehicle 10 (i.e. when $\beta_1+\pi < \delta_{HV} < \beta_1$).

The $2^{nd}$ quadrant is defined by the following conditions:

$$\theta_{PB} < \theta_{HV}, \phi_{PB} > \theta_{HV}, \left(\frac{3}{2}\pi \leq \beta_1 < 2\pi\right).$$

Within the $1^{st}$ quadrant, certain headings of the host vehicle 10 and the passenger bus 14 that result in crossing paths can be determined by the following matrices in Table 2, where $\delta_{HV} < \delta_{PB}$ in one matrix and $\delta_{HV} > \delta_{PB}$ in the other matrix.

TABLE 2

Matrices Representing Possible Crossing Paths in the $2^{nd}$ Quadrant

|  | YZ | 00<br>$0 \leq \delta_{PB} \leq$<br>$\beta_1 - \pi$ | 01<br>$\beta_1 - \pi <$<br>$\delta_{PB} \leq \beta_1$ | 11<br>$\beta_1 <$<br>$\delta_{PB} < 2\pi$ |
|---|---|---|---|---|
| $\delta_{HV} < \delta_{PB}$ |  |  |  |  |
| WX |  |  |  |  |
| 00 | $0 \leq \delta_{HV} \leq \beta_1 - \pi$ | 1 | 0 | 0 |
| 01 | $\beta_1 - \pi < \delta_{HV} \leq \beta_1$ | x | 0 | 0 |
| 11 | $\beta_1 < \delta_{HV} < 2\pi$ | x | x | 1 |
| $\delta_{HV} > \delta_{RV}$ |  |  |  |  |
| WX |  |  |  |  |
| 00 | $0 \leq \delta_{HV} \leq \beta_1 - \pi$ | 0 | x | x |
| 01 | $\beta_1 - \pi < \delta_{HV} \leq \beta_1$ | 0 | 1 | x |
| 11 | $\beta_1 < \delta_{HV} < 2\pi$ | 1 | 0 | 0 |

The two matrices identify four cases where paths cross (1), eight cases where paths do not cross (0) and six cases that are not possible (x). For example, if the heading angle $\delta_{HV}$ of the host vehicle 10 is greater than $\beta_1$, and the heading angle $\delta_{RV}$ of the passenger bus 14 is less than $\beta_1-\pi$, then $\delta_{HV}$ cannot be less than $\delta_{PB}$ (WXYZ=1100 for $\delta_{HV} < \delta_{PB}$). It can also be seen that when the passenger bus 14 is in the $2^{nd}$ quadrant, the passenger bus 14 will be to the right (EF=11) of the host vehicle 10 when the heading angle of the host vehicle 10 is greater than $\beta_1-\pi$ and less than $\beta_1$ ($\beta_1-\pi < \delta_{HV} < \beta_1$) otherwise the passenger bus 14 will be to the left (EF=01) of the host vehicle 10 (i.e., when $\beta_1 < \delta_{HV} < \beta_1-\pi$).

The $3^{rd}$ quadrant is defined by the following conditions:

$$\theta_{PB} < \theta_{HV}, \phi_{PB} < \theta_{HV}, \left(\pi \leq \beta_1 < \frac{3}{2}\pi\right).$$

Within the $3^{rd}$ quadrant, certain headings of the host vehicle 10 and the passenger bus 14 that result in crossing paths can be determined by the following matrices in Table 3, where $\delta_{HV} < \delta_{RV}$ in one matrix and $\delta_{HV} > \delta_{RV}$ in the other matrix.

TABLE 3

Matrices Representing Possible Crossing Paths in the $3^{rd}$ Quadrant

|  | YZ | 00<br>$0 \leq \delta_{PB} \leq$<br>$\beta_1 - \pi$ | 01<br>$\beta_1 - \pi <$<br>$\delta_{PB} \leq \beta_1$ | 11<br>$\beta_1 <$<br>$\delta_{PB} < 2\pi$ |
|---|---|---|---|---|
| $\delta_{HV} < \delta_{PB}$ |  |  |  |  |
| WX |  |  |  |  |
| 00 | $0 \leq \delta_{HV} \leq \beta_1 - \pi$ | 1 | 0 | 0 |
| 01 | $\beta_1 - \pi < \delta_{HV} \leq \beta_1$ | x | 0 | 0 |
| 11 | $\beta_1 < \delta_{HV} < 2\pi$ | x | x | 1 |
| $\delta_{HV} > \delta_{PB}$ |  |  |  |  |
| WX |  |  |  |  |
| 00 | $0 \leq \delta_{HV} \leq \beta_1 - \pi$ | 0 | x | x |
| 01 | $\beta_1 - \pi < \delta_{HV} \leq \beta_1$ | 0 | 1 | x |
| 11 | $\beta_1 < \delta_{HV} < 2\pi$ | 1 | 0 | 0 |

The two matrices again identify four cases where paths cross (1), eight cases where paths do not cross (0) and six cases that are not possible (x). It should be noted that these matrices are the same as those for the $3^{rd}$ quadrant. It can also be seen that when the passenger bus 14 is in the $3^{rd}$ quadrant, the passenger bus 14 will be to the right (EF=11) of the host vehicle 10 when the heading angle of the host vehicle 10 is greater than $\beta_1-\pi$ and less than $\beta_1$ ($\beta_1-\pi < \delta_{HV} < \beta_1$), otherwise the passenger bus 14 will be to the left (EF=01) of the host vehicle 10 (i.e., when $\beta_1 < \delta_{HV} < \beta_1-\pi$). This is also the same as if the passenger bus 14 were in the $2^{nd}$ quadrant.

The $4^{th}$ quadrant is defined by the following conditions:

$$\theta_{PB} > \theta_{HV}, \phi_{PB} < \theta_{HV}, \left(\frac{\pi}{2} \leq \beta_1 < \pi\right).$$

Within the $4^{th}$ quadrant, certain headings of the host vehicle 10 and the passenger bus 14 that result in crossing paths can be determined by the following matrices in Table 4 where $\delta_{HV} < \delta_{PB}$ in one matrix and $\delta_{HV} > \delta_{PB}$ in the other matrix.

TABLE 4

Matrices Representing Possible Crossing Paths in the $4^{th}$ Quadrant

|  | YZ | 00<br>$0 \leq$<br>$\delta_{PB} \leq \beta_1$ | 01<br>$\beta_1 < \delta_{PB} \leq$<br>$\beta_1 + \pi$ | 11<br>$\beta_1 + \pi <$<br>$\delta_{PB} < 2\pi$ |
|---|---|---|---|---|
| $\delta_{HV} < \delta_{PB}$ |  |  |  |  |
| WX |  |  |  |  |
| 00 | $0 \leq \delta_{HV} \leq \beta_1$ | 0 | 0 | 1 |
| 01 | $\beta_1 < \delta_{HV} \leq \beta_1 + \pi$ | x | 1 | 0 |
| 11 | $\beta_1 + \pi < \delta_{HV} < 2\pi$ | x | x | 0 |

TABLE 4-continued

Matrices Representing Possible Crossing Paths in the 4$^{th}$ Quadrant

| YZ | | 00<br>$0 \leq$<br>$\delta_{PB} \leq \beta_1$ | 01<br>$\beta_1 < \delta_{PB} \leq$<br>$\beta_1 + \pi$ | 11<br>$\beta_1 + \pi <$<br>$\delta_{PB} < 2\pi$ |
|---|---|---|---|---|
| $\delta_{HV} > \delta_{RV}$<br>XW | | | | |
| 00 | $0 \leq \delta_{HV} \leq \beta_1$ | 1 | x | x |
| 01 | $\beta_1 < \delta_{HV} \leq \beta_1 + \pi$ | 0 | 0 | x |
| 11 | $\beta_1 + \pi < \delta_{HV} <$<br>$2\pi$ | 0 | 0 | 1 |

The two matrices identify four cases where paths cross (1), eight cases where paths do not cross (0) and six cases that are not possible (x). These matrices are the same as those for the 1$^{st}$ quadrant. It can also be seen that when the passenger bus 14 is in the 4$^{th}$ quadrant, the passenger bus 14 will be to the left (EF=01) of the host vehicle 10 when the heading angle of the host vehicle 10 is greater than $\beta_1$ and less than $\beta_1+\pi(\beta_1<\delta_{HV}<\beta_1+\pi)$, otherwise the passenger bus 14 will be to the right (EF=11) of the host vehicle 10 (i.e., when $\beta_1+\pi<\delta_{HV}<\beta_1$). This also is the same as if the passenger bus 14 were in the 1$^{st}$ quadrant.

Thus, the characteristic relating to the quadrant that includes the passenger bus 14 location is different from at least one other characteristic relating to at least one other of the quadrants.

Moreover, as can be appreciated from the above, the processing determines the quadrant in which the passenger bus 14 is present by determining a linear direction between the host vehicle location and the passenger bus location at a moment in time, determining an angle between a threshold direction and the linear direction at the moment in time, and determining the quadrant in which the passenger bus 14 is present based on the angle.

Thus, in these embodiments, the controller 20 is capable of determining whether the passenger bus 14 and the host vehicle 10 will cross paths or if the host vehicle 10 will pass a stopped passenger bus. Such a determination can facilitate a determination of whether it will be necessary to perform a mitigation operation to preclude the host vehicle from passing a passenger bus when the passenger bus is picking up or dropping off passengers. That is, under the scenarios above, the controller 20 may determine that the host vehicle 10 will pass the passenger bus 14 when the passenger bus is picking up or dropping off passengers. Under this scenario, the controller 20 may determine that a mitigation operation is necessary. However, the controller 20 may determine that the host vehicle 10 will not pass the passenger bus 14. If this determination is made, and the distance between the host vehicle location and the passenger bus location is greater than a threshold distance, a mitigation operation may not be necessary.

Figure 9:
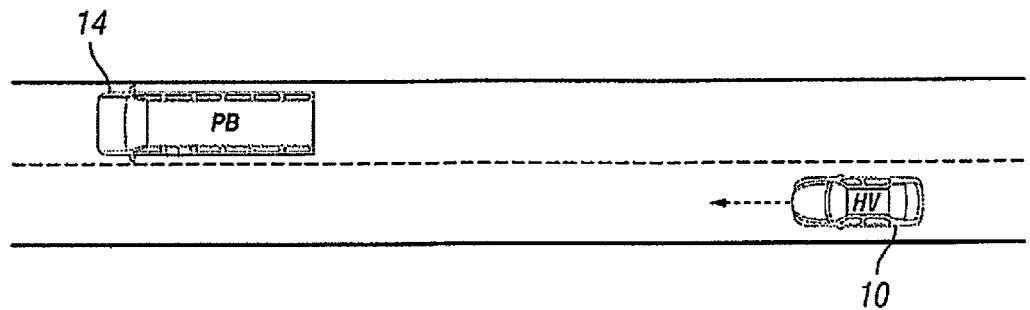
FIGS. 9 through 13 are exemplary diagrams illustrating different scenarios that are handled by the passenger bus monitoring system according to disclosed embodiments.
Figure 10:
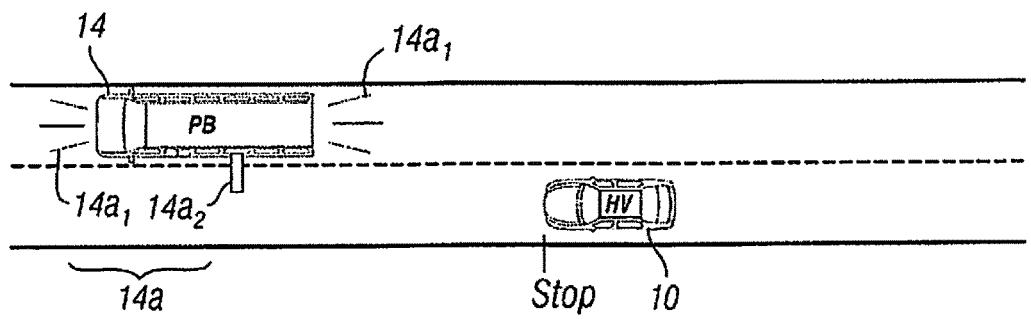

FIGS. 9-13 illustrate exemplary scenarios that may require a mitigation operation from the host vehicle 10. FIGS. 9 and 10 illustrates a scenario in which host vehicle 10 is behind the passenger bus 14 and is traveling at a faster speed than the passenger bus 14 or the passenger bus 14 is stopped or stopping. As described above, the host vehicle 10 receives passenger bus 14 information, including the passenger bus location and that the passenger bus 14 has activated a passenger bus operation status 14a (i.e., the passenger bus is in a passenger departing and/or loading mode). As the host vehicle 10 approaches the passenger bus 14, the controller 20 determines that the distance between the host vehicle location and the passenger bus location is decreasing and the distance is equal to the first threshold distance. Moreover, the controller 20 determines that based on the current jurisdiction, the host vehicle 10 must slow down or stop while the passenger bus 14 is in a passenger departing or loading mode. The controller 20 performs a mitigation operation by causing the warning indicator 26 to indicate that a passenger bus 14 is in a passenger departing or loading mode. For example, the controller 20 may cause a visual warning on the information display unit 44 that reads "School Bus Ahead—Apply Brakes—Passengers Departing", or can be any other suitable warning discussed herein.

As the host vehicle 10 approaches the passenger bus 14, the controller 20 may determine that an additional mitigation operation should be performed. For example, when the distance between the host vehicle 10 and the passenger bus 14 is less than the second threshold distance, and the host vehicle 10 has not altered its trajectory or stopped as required by the current jurisdiction, the controller 20 can apply a mitigation operation, such as applying the brakes 52 of the host vehicle 10 such that the host vehicle 10 stops before passing the passenger bus 14 or before coming within the legal distance of the passenger bus 14. Further, the mitigation operation can maintain the host vehicle 10 at a predetermined distance (i.e., the distance required by the jurisdiction) from the passenger bus 14.

As the passenger bus 14 completes loading passengers or allowing passengers to depart, the controller 20 will determine when the passenger bus operation status 14a has changed (i.e., the passenger bus is no longer in a passenger departing and/or loading mode), terminating the application of brakes 52 and terminating the warning.

Figure 11:
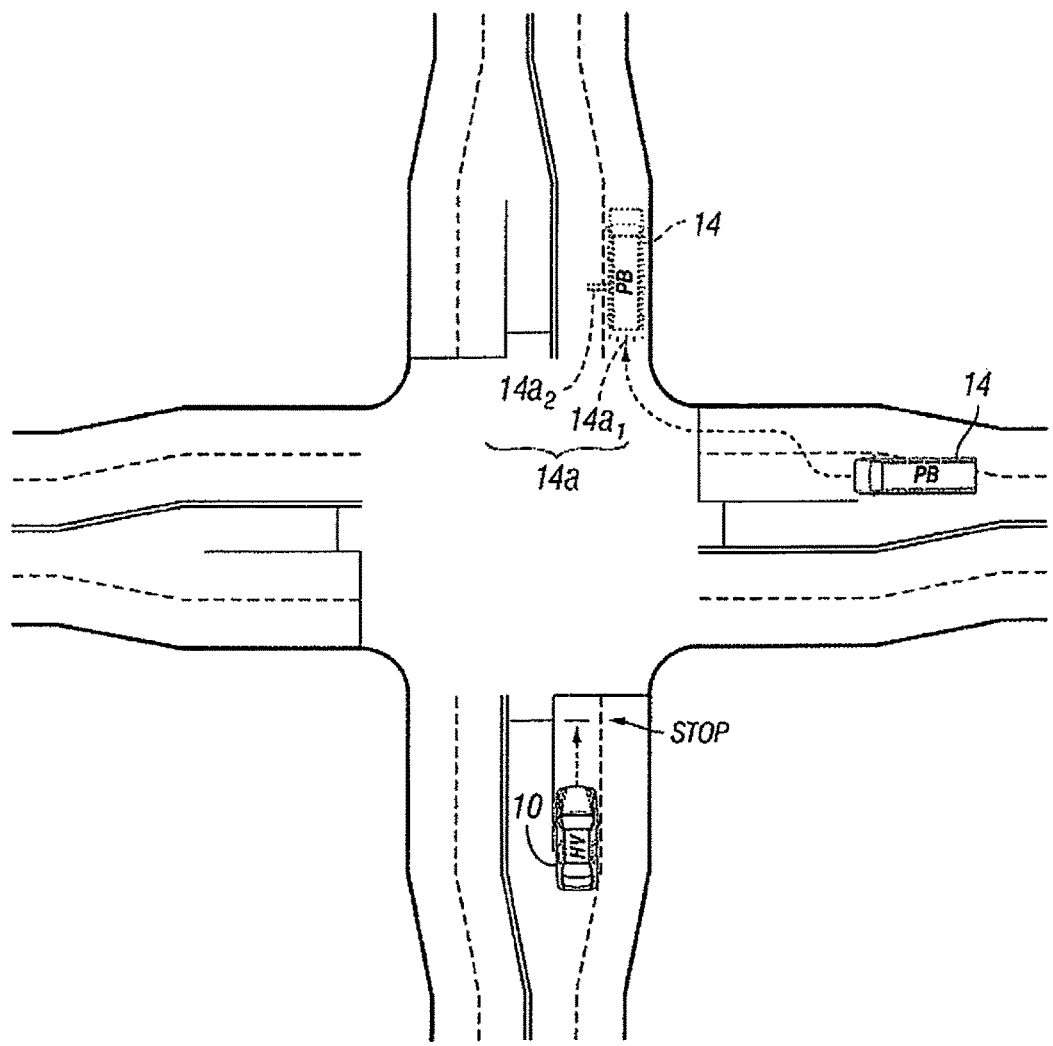

FIG. 11 illustrates a scenario in which a passenger bus 14 and the host vehicle 10 are approaching an intersection. In this scenario, the passenger bus 14 is approaching the intersection from a transverse direction relative to the host vehicle 10, and turning right, such that if the host vehicle 10 and the passenger bus 14 travel unabated they may contact each other or the host vehicle will be behind the passenger bus. As described above, the host vehicle 10 receives passenger bus 14 information as the passenger bus turns right that the passenger bus 14 is in a passenger bus operation status 14a (i.e., the passenger bus is in a passenger departing and/or loading mode). As the host vehicle 10 approaches the intersection, the controller 20 determines that the distance between the host vehicle location and the passenger bus location is decreasing and the distance is equal to the first threshold distance. Moreover, the controller 20 determines that based on the current jurisdiction, the host vehicle 10 must slow down or stop while the passenger bus 14 is in a passenger departing or loading mode. The controller 20 performs a mitigation operation by causing the warning indicator 26 to indicate that a passenger bus 14 is in a passenger departing or loading mode. For example, the controller 20 may cause a visual warning on the information display unit 44 that reads "School Bus Ahead—Apply Brakes—Passengers Departing", or can be any other suitable warning discussed herein.

As the host vehicle 10 approaches the passenger bus 14, the controller 20 may determine that an additional mitigation operation should be performed. For example, when the distance between the host vehicle 10 and the passenger bus 14 is less than the second threshold distance, and the host vehicle 10 has not altered its trajectory or stopped as required by the current jurisdiction, the controller 20 can apply a mitigation operation, such as applying the brakes 52 of the host vehicle 10 such that the host vehicle 10 stops before passing the passenger bus 14 or before coming within the legal distance of the passenger bus.

Further, in this scenario, the controller 20 may determine that the host vehicle should not enter the intersection, since to maintain the proper jurisdictional distance between the host vehicle 10 and the passenger bus 14, the host vehicle would stop in the middle of the intersection. In this scenario, the host vehicle mitigation operation can cause the host vehicle 10 to stop prior to entering the intersection.

As the passenger bus 14 completes loading passengers or allowing passengers to depart, the controller 20 will determine when the passenger bus operation status 14a has changed (i.e., the passenger bus is no longer in a passenger departing and/or loading mode), terminating the application of brakes 52 and terminating the warning.

Figure 12:
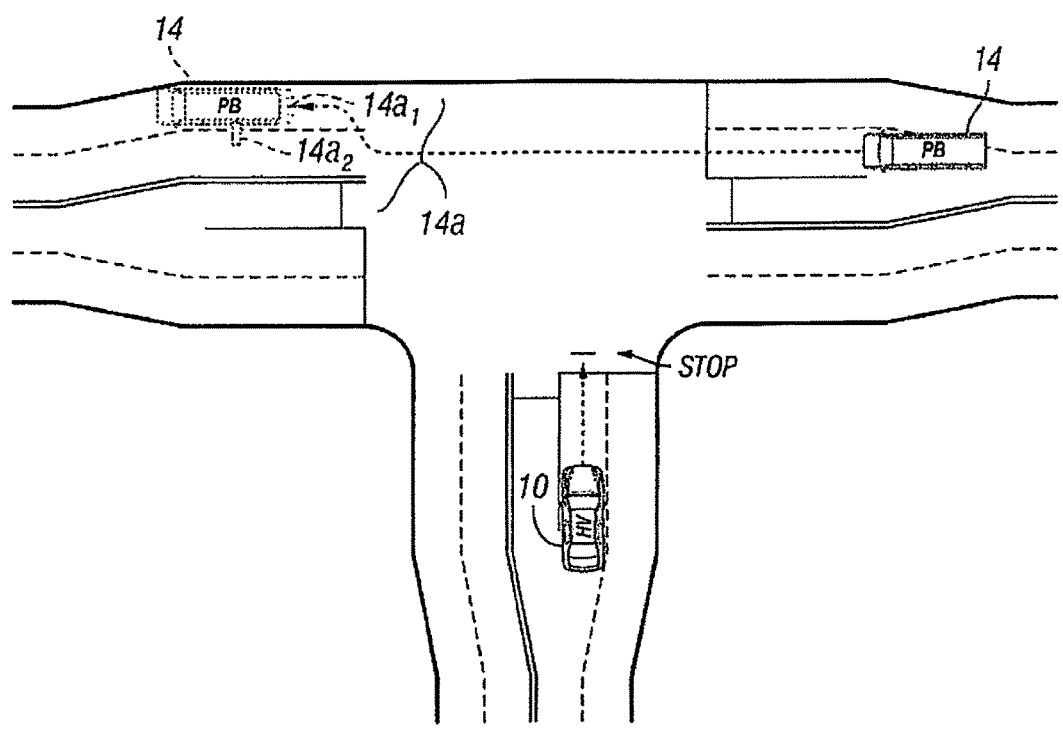

FIG. 12 illustrates a scenario in which a passenger bus 14 and the host vehicle 10 are approaching an intersection. In this scenario, the passenger bus 14 is approaching the intersection from a transverse direction relative to the host vehicle 10, and the host vehicle 10 is turning right, such that if the host vehicle 10 and the passenger bus 14 travel unabated they may contact each other or the host vehicle will be behind the passenger bus. As described above, the host vehicle 10 receives passenger bus 14 information as the passenger bus passes through the intersection that the passenger bus 14 is in a passenger bus operation status 14a (i.e., the passenger bus is in a passenger departing and/or loading mode). As the host vehicle 10 approaches the intersection, the controller 20 determines that the distance between the host vehicle location and the passenger bus location is decreasing and the distance is equal to the first threshold distance. Moreover, the controller 20 determines that based on the current jurisdiction, the host vehicle 10 must slow down or stop while the passenger bus 14 is in a passenger departing or loading mode. The controller 20 performs a mitigation operation by causing the warning indicator 26 to indicate that a passenger bus 14 is in a passenger departing or loading mode. For example, the controller 20 may cause a visual warning on the information display unit 44 that reads "School Bus Ahead—Apply Brakes—Passengers Departing", or can be any other suitable warning discussed herein.

As the host vehicle 10 approaches the passenger bus 14, the controller 20 may determine that an additional mitigation operation should be performed. For example, when the distance between the host vehicle 10 and the passenger bus 14 is less than the second threshold distance, and the host vehicle 10 has not altered its trajectory or stopped as required by the current jurisdiction, the controller 20 can apply a mitigation operation, such as applying the brakes 52 of the host vehicle 10 such that the host vehicle 10 stops before passing the passenger bus 14 or before coming within the legal distance of the passenger bus.

Further, in this scenario, the controller 20 may determine that the host vehicle should not enter the intersection, since to maintain the proper jurisdictional distance between the host vehicle 10 and the passenger bus 14, the host vehicle would stop in the middle of the intersection. In this scenario, the host vehicle mitigation operation can cause the host vehicle 10 to stop prior to entering the intersection.

As the passenger bus 14 completes loading passengers or allowing passengers to depart, the controller 20 will determine when the passenger bus operation status has changed (i.e., the passenger bus is no longer in a passenger departing and/or loading mode), terminating the application of brakes 52 and terminating the warning.

Figure 13:
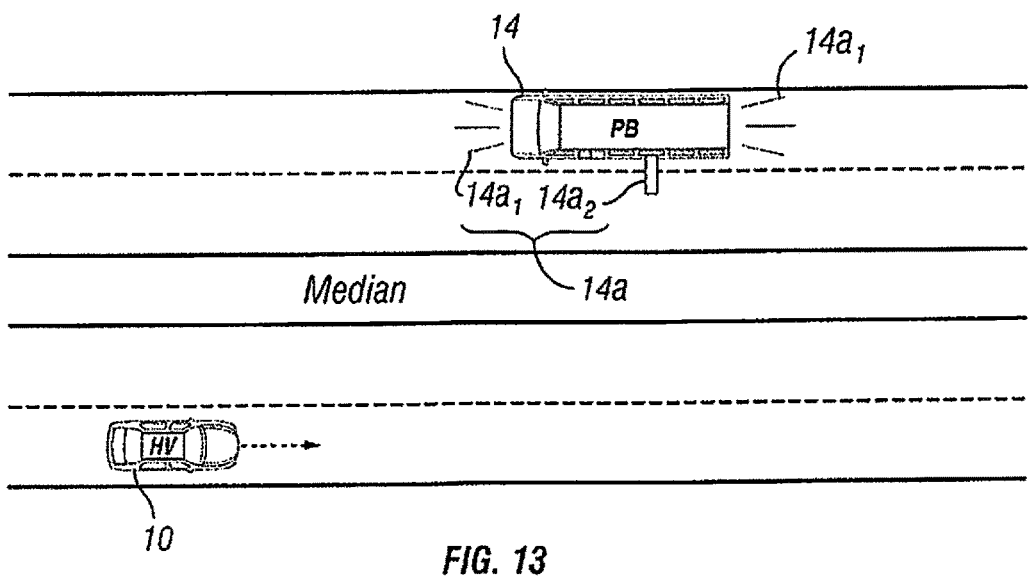

FIG. 13 illustrates a scenario in which a passenger bus 14 is approaching the host vehicle 10 from the opposite lane on a multilane road with a median therebetween. As described above, the host vehicle 10 receives passenger bus information, including that the passenger bus 14 is in a passenger bus operation status 14a (i.e., the passenger bus is in a passenger departing and/or loading mode). As the passenger bus 14 approaches the host vehicle 10, the controller 20 determines that the distance between the host vehicle location and the passenger bus location is decreasing. However, since the passenger bus 14 and the host vehicle 10 are separated by multiple lanes and a median, the distance between the host vehicle location and the passenger bus location does is not less than the first threshold distance. Thus, the controller 20 does not perform a mitigation operation.

Alternatively, the controller 20 may determine that based on the current jurisdiction that it is not necessary to perform any action when a passenger bus 14 is traveling in the opposite direction from the host vehicle 10 on a road that includes a median.

The above scenarios are merely exemplary and numerous additional intersection and road scenarios are possible.

The passenger bus monitoring system 12 and method described herein provides passenger bus 14 information to host vehicle 10 so as to improve vehicle safety and abide by local jurisdictional requirements in the host vehicle to maintain the proper distances from a passenger bus when a passenger bus is in a passenger bus operation status (i.e., the passenger bus is in a passenger departing and/or loading mode).

Moreover, when the passenger bus is not in passenger bus operation status (i.e., the passenger bus 14 is in a passenger departing and/or loading mode), the host vehicle 10 may treat the passenger bus 14 as a remote vehicle. For example, see U.S. patent application Ser. No. 13/952,414, entitled "Vehicle Collision Monitoring Method", U.S. patent application Ser. No. 13/689,523, entitled "Vehicle Intersection Monitoring System and Method", U.S. patent application Ser. No. 13/689,452, entitled "Vehicle Intersection Monitoring System and Method", U.S. patent application Ser. No. 13/689,484, entitled "Vehicle Intersection Monitoring System and Method", and U.S. patent application Ser. No. 13/689,564, entitled "Vehicle Intersection Monitoring System and Method", all of these applications being incorporated by reference herein, which discuss the treatment of remote vehicles.

The storage devices and GPS are conventional components that are well known in the art. Since storage devices and GPS are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "front", "rear", "left", and "right" as well as any other similar directional terms refer to those directions of a vehicle equipped with the Method and System of Assisting a Driver of a Vehicle. Accordingly, these terms, as utilized to describe the present invention should be interpreted relative to a vehicle equipped with the Method and System of Assisting a Driver of a Vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A passenger bus monitoring method comprising:
generating host vehicle information with a navigation unit, the host vehicle information including a host vehicle location and a host vehicle heading;
receiving passenger bus information with a receiver, the passenger bus information including an indication of a change in a passenger bus operation status, a passenger bus location and a passenger bus heading;
determining with a controller a distance between the host vehicle location and the passenger bus location;
determining with the controller whether the distance between host vehicle location and the passenger bus location is decreasing, and whether the host vehicle trajectory will cause the host vehicle to pass the passenger bus; and
performing a mitigation operation by the host vehicle, when the indication of the change in a passenger bus operation status is received, when the distance between host vehicle location and the passenger bus location is decreasing, when the host vehicle trajectory will cause the host vehicle to pass the passenger bus without a threat of contact between the host vehicle and the passenger bus, and the distance between host vehicle location and the passenger bus location is a threshold distance or less.

2. The method according to claim 1, further comprising ceasing the mitigation operation based on a predetermined condition.

3. The method according to claim 2, wherein
the predetermined condition is another change in the passenger bus operation status.

4. A passenger bus monitoring method comprising:
generating host vehicle information with a navigation unit, the host vehicle information including a host vehicle location and a host vehicle heading;
receiving passenger bus information with a receiver, the passenger bus information including a passenger bus status, a passenger bus location and a passenger bus heading;
determining with a controller a distance between the host vehicle location and the passenger bus location;
determining with the controller whether the distance between host vehicle location and the passenger bus location is decreasing;
performing a mitigation operation by the host vehicle, when the distance between host vehicle location and the passenger bus location is decreasing, and the distance between host vehicle location and the passenger bus location is a threshold distance or less without a threat of contact between the host vehicle and the passenger bus; and
ceasing the mitigation operation based on a predetermined condition, the predetermined condition being a deactivation of passenger bus caution lights.

5. The method according to claim 2, further comprising performing an intervention operation when the distance between the host vehicle location and the passenger bus location is decreasing, and the distance between the host vehicle location and the passenger bus location is a second threshold distance or less.

6. The method according to claim 5, wherein
the second threshold distance is less than the first threshold distance.

7. The method according to claim 6, further comprising ceasing the intervention operation based on the predetermined condition.

8. The method according to claim 7, wherein
the predetermined condition is a change in the passenger bus operation status.

9. The method according to claim 5, wherein
the performing the intervention operation includes at least one of braking the host vehicle and altering the trajectory of the host vehicle.

10. The method according to claim 5, wherein
the performing the intervention operation includes maintaining at least the second threshold distance between the host vehicle location and the passenger bus location.

11. The method according to claim 10, further comprising determining with the controller jurisdictional rules with respect to passenger buses at the host vehicle location.

12. The method according to claim 11, wherein
determining with the controller the jurisdictional rules includes determining the jurisdictional distance to be maintained between the host vehicle location and the passenger bus location.

13. The method according to claim 12, wherein
the performing the intervention operation includes operating brakes of the host vehicle to maintain the second threshold distance.

14. The method according to claim 12, wherein
the performing the intervention operation includes altering the trajectory of the host vehicle to maintain the second threshold distance.

15. The method according to claim 2, wherein
the predetermined condition is a ceasing of a caution state.

16. The method according to claim 15, wherein
the ceasing of the caution state includes retracting a stop sign while maintaining the activation of caution lights.

17. The method according to claim 1, further comprising
determining with the controller jurisdictional rules with respect to passenger bus at the host vehicle location.

18. The method according to claim 17, wherein
the performing the mitigation operation includes notifying occupants of the host vehicle of the jurisdictional rules.

19. The method according to claim 1, wherein
the activating the advisory includes activating an interior warning.

20. The method according to claim 1, wherein
the activating the advisory includes activating an auditory advisory.

* * * * *